A. BRIDGES.
Improvement in Car-Springs.
No. 133,010.   Fig. 1.   Patented Nov. 12, 1872.
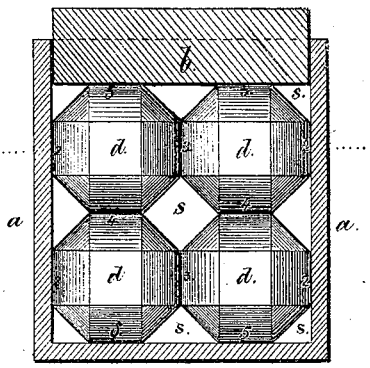
Fig. 2.
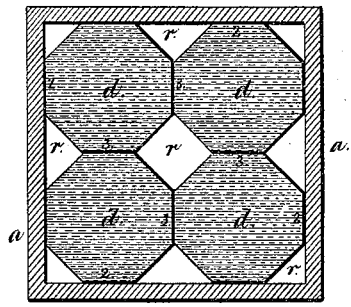
Fig. 3.
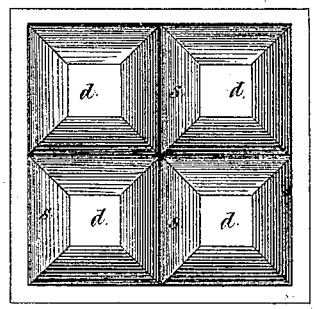
Fig. 4.
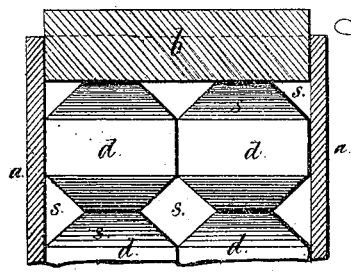
Witnesses,
Chas. H. Smith
Geo. T. Pinckney
Inventor,
Albert Bridges
Lemuel W. Serrell
atty

UNITED STATES PATENT OFFICE.

ALBERT BRIDGES, OF JERSEY CITY, NEW JERSEY.

IMPROVEMENT IN CAR-SPRINGS.

Specification forming part of Letters Patent No. 133,010, dated November 12, 1872.

*To all whom it may concern:*

Be it known that I, ALBERT BRIDGES, of Jersey City, in the county of Hudson and State of New Jersey, have invented an Improvement in Car-Springs; and the following is declared to be a correct description of the same.

Before my invention a car-spring had been made by pieces of India rubber introduced promiscuously into a box having a follower sliding in the same and compressing the rubber, the elasticity resulting from change of form as the rubber expands into the intervening interstices. In this instance the action was not uniform and reliable. Balls of rubber have also been employed, but partitions between the layers have been required to prevent the balls slipping out of their position, and the balls do not take an equal and uniform bearing under the pressure to which they are subjected. My invention is made to prevent these difficulties; and consists of a car-spring made of ranges of polyhedrons of India rubber in an inclosing-case, the flat sides of said polyhedrons being in such positions that they come into contact with the surrounding case and with the adjacent springs in the same range and with the springs in the ranges above and below, or with the top and bottom followers. By the use of polyhedrons the rubber springs can be made to take a greater or less bearing against its surrounding parts. Thereby the spring can be adapted to greater or less loads, and the intervening spaces can be larger or smaller, and proportioned with reference to the amount of motion that the spring is to allow for.

In the drawing, Figure 1 is a section of the inclosing-case vertically and a side view of the polyhedron springs; Fig. 2 is a horizontal section of the same at the line $x\ x$; Fig. 3 is a plan of the polyhedron springs in a form adapted to freight and heavy passenger-cars; and Fig. 4 is an elevation of such springs with the case in section.

The case $a$ is to be of any desired size and shape, and may be in the form of a box, as shown, with a follower, $b$, at the top, or there may be also a follower at the bottom, and, if desired, the case $a$ may be in sections inclosing each range of springs separately. The polyhedron springs $d$ of rubber are shown in Figs. 1 and 2 as eight-sided figures, when cut by a horizontal or vertical plane, in order that there may be flat sides 2 2 to rest against the inclosing-case; sides 3 3 to rest against the adjacent springs in the same range; and sides 4 and 5 to rest against the corresponding surfaces of the range above or below, or against the surfaces of the followers or the bottom of the case. The interstices $r$ and $s$ allow of the springs spreading either horizontally or diagonally when under pressure, and relieving the car from concussion; and according to the extent of the interstices, so the spring will be more or less rigid. In Figs. 3 and 4 the polyhedrons are quadrilateral when cut by a horizontal plane, and octahedrons when cut by a vertical plane, so that there are only the spaces $s$, into which the rubber is compressed diagonally when under pressure. This spring is adapted to freight and heavy cars.

In all instances the springs have flat bearing-surfaces in contact with the adjacent parts; thereby the springs are not liable to injury, and there are not any intermediate partitions required.

If desired, the rubber might be molded to the shapes shown either in the ranges of springs or in mass; but I prefer the separate polyhedrons, because any desired number can be employed, according to the character of spring that is to be produced.

I claim as my invention—

A car-spring made of India-rubber polyhedrons, having top and bottom and side flat bearing-surfaces, substantially as and for the purposes set forth.

Signed by me this 27th day of March, A. D. 1872.

ALBERT BRIDGES.

Witnesses:
GEO. T. PINCKNEY,
CHAS. H. SMITH.